United States Patent
Piccolomini

(10) Patent No.: US 6,488,253 B1
(45) Date of Patent: Dec. 3, 2002

(54) APPARATUS FOR HOLDING OBJECTS STATIONARY

(76) Inventor: Victor W. Piccolomini, 6295 Iverson Ter. South, Frederick, MD (US) 21701

( * ) Notice: Subject to any disclaimer, the term of this patent is extended or adjusted under 35 U.S.C. 154(b) by 0 days.

(21) Appl. No.: 09/867,244

(22) Filed: May 30, 2001

(51) Int. Cl.$^7$ .............................................. F16M 13/02
(52) U.S. Cl. ...................... 248/505; 248/907; 248/154; 24/601.5
(58) Field of Search ................................ 248/508, 154, 248/500, 506, 509, 907; 24/601.5, 509

(56) References Cited

U.S. PATENT DOCUMENTS

| | | | |
|---|---|---|---|
| 1,598,135 A | | 8/1926 | Heinson et al. |
| 2,430,672 A | * | 11/1947 | Gandrud ..................... 248/156 |
| 2,809,006 A | * | 10/1957 | Jansey ......................... 248/361 |
| 2,939,468 A | * | 6/1960 | Boyce .......................... 135/15 |
| 3,241,202 A | * | 3/1966 | Knauft ........................... 24/85 |
| 3,295,691 A | * | 1/1967 | Bowman ..................... 211/71 |
| 3,315,817 A | * | 4/1967 | Hook .......................... 211/71 |
| 3,498,576 A | * | 3/1970 | Alissandratos ............. 248/221 |
| 3,527,355 A | * | 9/1970 | Boyer .......................... 211/71 |
| 3,666,222 A | * | 5/1972 | Griggers ..................... 248/146 |
| 3,675,783 A | * | 7/1972 | Reese .......................... 211/71 |
| 4,458,393 A | * | 7/1984 | Pogharian et al. ............ 24/234 |
| 5,094,423 A | * | 3/1992 | Almquist et al. ........... 248/552 |
| 5,176,354 A | * | 1/1993 | Feigenbaum, Jr. .......... 248/508 |
| 5,245,715 A | * | 9/1993 | Dinkins ........................ 5/417 |
| 5,390,890 A | * | 2/1995 | Ferguson et al. ........... 248/545 |
| 5,713,383 A | * | 2/1998 | Ramirez et al. ............ 135/118 |
| 5,887,834 A | * | 3/1999 | Gellos et al. ................ 248/156 |
| 6,226,813 B1 | * | 5/2001 | Wilburn et al. ................ 5/417 |

* cited by examiner

*Primary Examiner*—Anita King
*Assistant Examiner*—Steven Marsh
(74) *Attorney, Agent, or Firm*—Donald A. Kettlestrings

(57) ABSTRACT

Apparatus for holding an object stationary includes a first supporting element or housing and an anchor or screw element for attaching the housing to a supporting surface. A claw-shaped element is pivotally connected to the housing and is normally urged by a spring positioned within the housing in a first direction for enabling the claw-shaped element to cooperate with or engage a bar element connected to the bottom of the object, whereby the object is prevented from being blown over, toppled, moved or carried away by the action of animals or the wind.

15 Claims, 3 Drawing Sheets

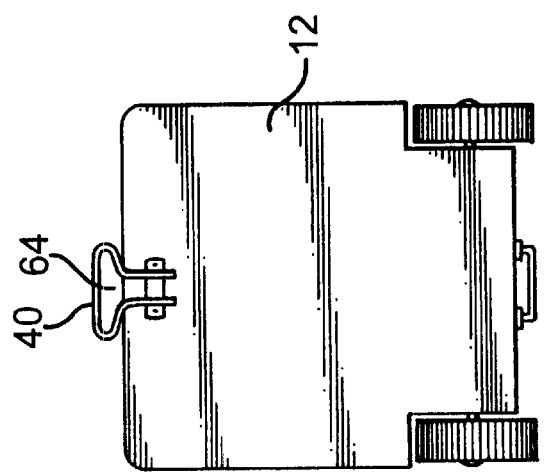
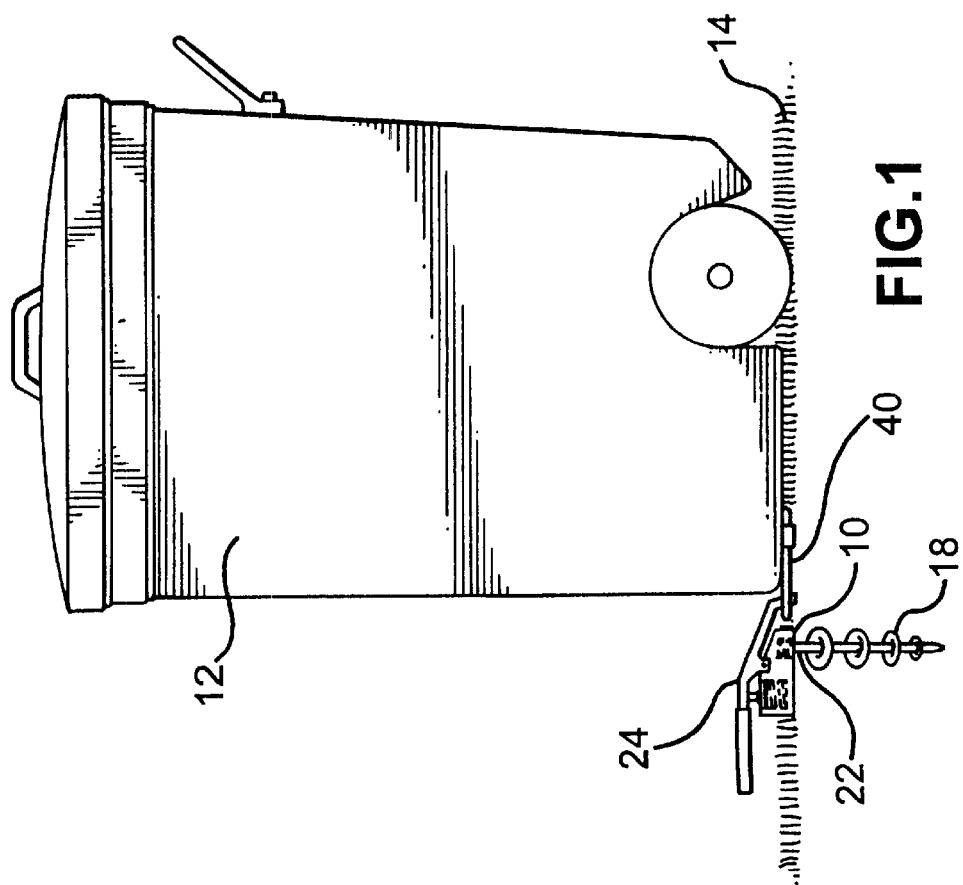

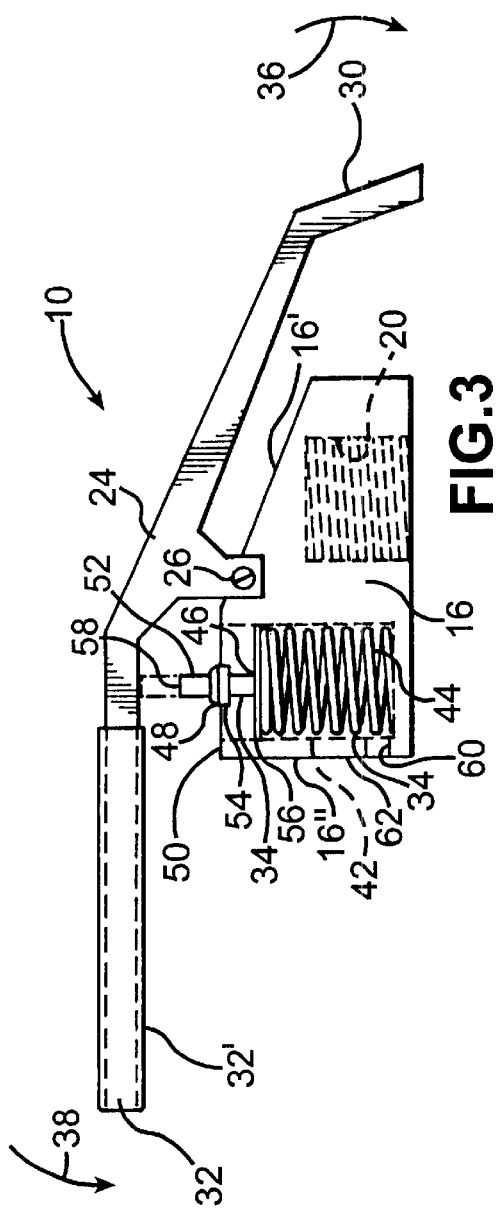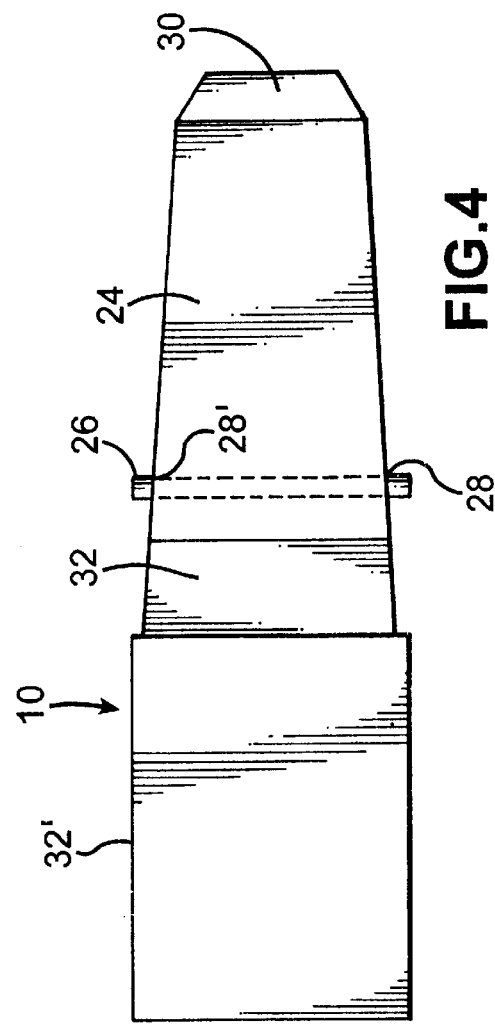

APPARATUS FOR HOLDING OBJECTS STATIONARY

BACKGROUND OF THE INVENTION

This invention relates to a holding apparatus and more particularly to apparatus for holding an object substantially stationary on a supporting surface.

Outdoor objects, such as trash cans, recycling bins, yard decorations, furniture, holiday decorations and the like, are often subjected to the actions of wind and animals that blow over, topple, move or carry away the outdoor objects.

BRIEF SUMMARY OF THE INVENTION

It is, therefore, an object of the present invention to provide apparatus for holding such objects substantially stationary on a supporting surface.

Another object is to provide such an apparatus which can hold such objects substantially stationary on the ground, concrete, asphalt or the like.

A further object of the invention is the provision of such apparatus which enables a user to quickly and easily engage and disengage the apparatus from the object being held.

Still another object is to provide such apparatus which can be quickly and easily removably attached to the ground, concrete, asphalt or the like.

Yet another object of the present invention is the provision of such apparatus which is configured to permit operation of the apparatus in all types of weather.

A still further object of the invention is the provision of such apparatus which is visually unobtrusive during use.

Still another object is to provide such apparatus which can be embedded into the ground so as to enable lawn mowers to mow over the top of the apparatus with no conflict.

Another object is to provide such apparatus which can be quickly and easily engaged and disengaged from the object being held by a simple foot action of the user which requires no bending or stooping.

Additional objects and advantages of the invention will be set forth in part in the description which follows, and in part will be obvious from the description, or may be learned by practice of the invention. The objects and advantages are realized and attained by means of the instrumentalities and combinations particularly pointed out in the appended claims.

To achieve these and other objects, the present invention provides apparatus for holding an object substantially stationary on a supporting surface, the apparatus comprising: a first supporting or housing element; a second anchoring or screw element for attachment to the first element for anchoring to the supporting surface; a third element pivotally connected to the first element, the third element defining a first claw-shaped end and an opposed second end; first means in operative relationship with the first and third elements for normally pivotally urging the third element in a first direction and for enabling pivotal movement of the third element in a second direction in response to an external force applied to the second end; and a fourth element connected to the object for selective cooperation or contact with the claw-shaped end when the third element is moved in the first direction, whereby the object is prevented from being blown over, toppled, moved or carried away by the actions of animals or the wind.

It is to be understood that both the foregoing general description and the following detailed description are exemplary and explanatory but are not restrictive of the invention.

BRIEF DESCRIPTION OF THE SEVERAL VIEWS OF THE DRAWINGS

The accompanying drawings, which are incorporated in and constitute a part of this specification, illustrate a preferred embodiment of the invention and, together with the description, serve to explain the principles of the invention.

FIG. 1 is an elevation view showing the apparatus holding a conventional trash can in position on the ground;

FIG. 2 is a top plan view of a conventional trash can with element 40 attached thereto;

FIG. 3 is an elevation view of apparatus 10, partly in section;

FIG. 4 is a top plan view of apparatus 10 and showing only pin 26 partly in phantom; and FIG. 5 is an elevation view of a conventional concrete anchoring element 18' to be used with apparatus 10 to anchor apparatus 10 to concrete, asphalt, pavement or the like.

DETAILED DESCRIPTION OF THE INVENTION

Figure 5:
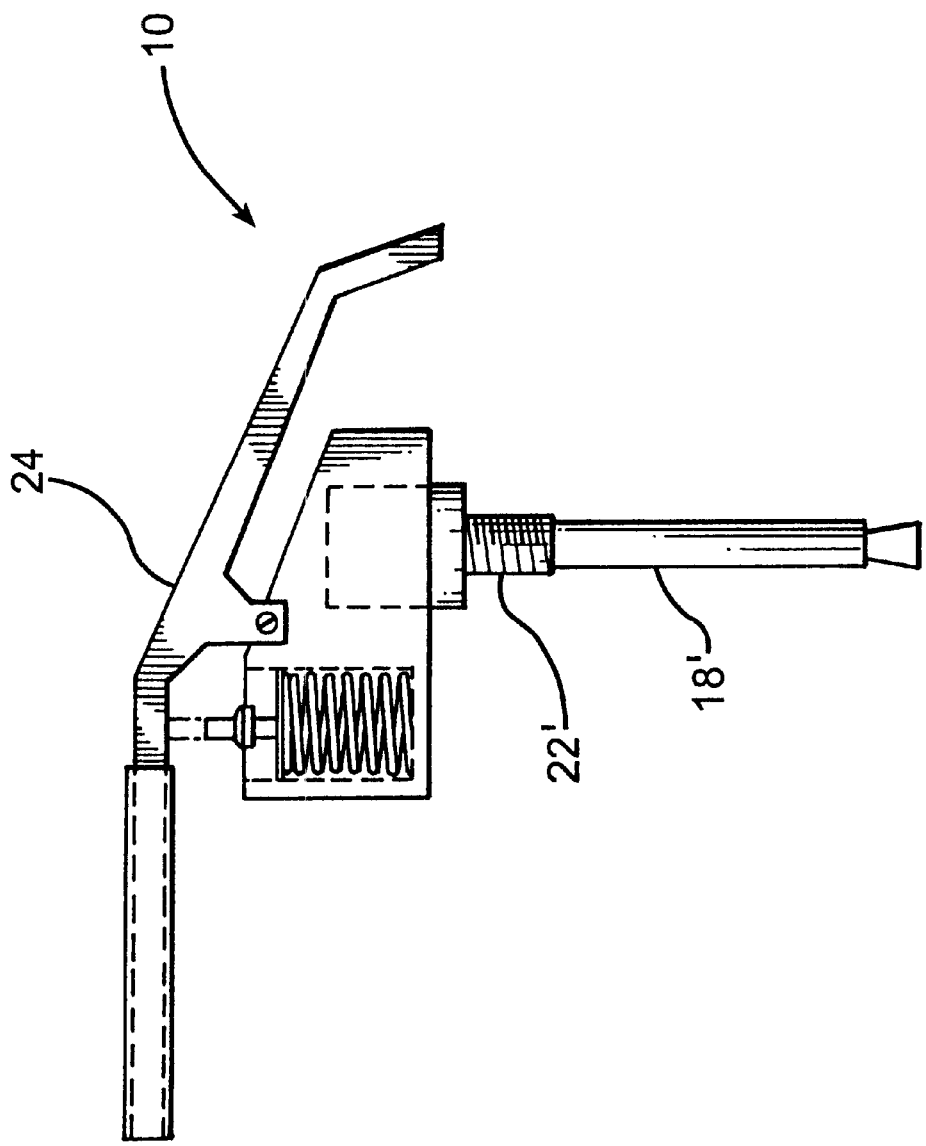

With reference now to the drawings, wherein like reference characters designate like or corresponding parts throughout the several views, there is shown apparatus 10 for holding an object 12 substantially stationary on a supporting surface 14, such as the ground, concrete, asphalt or the like. Apparatus 10 includes a first supporting or housing element 16 and a second element 18 or 18' for attachment to first element 16 for anchoring to supporting surface 14.

Anchoring element 18 includes a screw element for screwing into the ground or earth, and anchoring element 18' includes a conventional concrete anchor for anchoring to concrete, asphalt, pavement or the like.

First supporting or housing element 16 preferably includes an internally threaded cavity 20. Alternatively, an internally threaded nut element (not shown) could be conventionally attached to housing element 16. Upper end 22, 22' of anchoring elements 18, 18', respectively, are externally threaded for removable threadable engagement with the internal threads of cavity 20 or with the internal threads of the nut element (not shown) so that anchoring elements 18, 18' can be removably attached to housing 16.

In accordance with the invention, apparatus 10 further includes a third element 24 pivotally connected to housing element 16 by pivot pin or pins 26, which pass through or into housing 16. Pin or pins 26 are rotatably positioned within openings 28, 28' defined within third element 24. Element 24 can be held on pivot pin or pins 26 in a conventional manner, such as by cotter pins (not shown) which extend through holes (not shown) in the ends of pivot pin or pins 26. Other conventional configurations could be used to retain third element 24 in a rotatable relationship on pivot pin or pins 26. Third element 24 defines a first claw-shaped end 30 and an opposed second end 32.

Further in accordance with the invention, first means 34 are provided in operative relationship with supporting or housing element 16 and with third element 24 for normally pivotally urging third element 24 in a first direction 36 and for enabling pivotal movement of third element 24 in a second direction 38 in response to an external force applied in a downward direction to second end 32. The external force applied to second end 32 would typically be applied by the foot of a user.

Apparatus 10 further includes a fourth element 40 connected in a conventional manner to object 12 for selective cooperation or contact with claw-shaped end 30 when third element 24 is moved in first direction 36 by the action of first means 34, whereby object 12 is prevented from being blown over, toppled, moved or carried away by the action of animals or the wind.

First supporting element or housing 16 defines a first cavity 42 therein, and first means 34 includes a heavy duty spring 44 positioned within cavity 42.

First means 34 further includes an additional element 46 positioned between spring 44 and third element 24. Additional element 46 is positioned at least partially within cavity 42, and element 46 extends outwardly from cavity 42 through an upper opening 48 defined within upper surface 50 of housing 16 and in communication with cavity 42. A portion 52 of element 46 which extends through upper opening 48 normally engages an underside or portion of third element 24.

A liquid-sealing element 54, such as a plastic or rubber grommet, is positioned at and within opening 48 in a conventional manner for normally liquid-sealingly and slidingly contacting portion 52 of element 46 to prevent entry of liquid, such as water, into cavity 42.

Element 46 includes a substantially disk-shaped element 56 which defines a diameter greater than the size of upper opening 48 so that disk-shaped element 56 cannot pass through upper opening 48.

Portion 52 of element 46 includes a post 58 connected to disk-shaped element 56 in a conventional manner and extending normally upwardly through upper opening 48 in sliding and liquid-sealing contact with liquid-sealing element 54.

Housing 16 preferably defines a drainage opening 60 therein in fluid communication between cavity 42 and exterior surface 62 of supporting element or housing 16.

Further in accordance with the invention, fourth element 40 is preferably connected to object 12 in a position to normally contact or to be immediately adjacent to supporting surface 14. Fourth element 40 is preferably configured to define an open area 64 between fourth element 40 and object 12 for receiving claw-shaped end 30 so that a portion of fourth element 40 can be positioned and held between third element 24 and supporting surface 14.

In operation and use of apparatus 10 when the apparatus is anchored to the ground or earth, a small area of sod or earth is stripped or dug to create a hole to receive housing 16. Screw element 18 is connected to housing 16 by engaging the upper threaded end of element 18 with the interior threads of cavity 20. Apparatus 10 is then manually screwed into the ground within the pre-dug hole, and housing 16 is positioned within the pre-dug hole so that upper surface 50 of housing 16 is substantially level with the surface of the ground. Second end 32 of element 24 will normally be positioned approximately three quarters of an inch above upper surface 50 of housing 16 to permit a lawn mower to move over apparatus 10 and to cut the grass without interfering with apparatus 10.

Object 12, such as a trash can, is then moved into position so that claw-shaped end 30 of element 24 will be normally positioned within open area 64, and fourth element 40 will be held between element 24 and the ground or supporting surface 14.

When it is desired to move object 12 away from apparatus 10, the user places his or her foot on second end 32 of element 24 and pushes downwardly to cause rotation of element 24 in direction 38 and around pivot pin or pins 26. This causes upward movement of claw-shaped end 30 so that element 40, attached to object 12, is released from the grip of claw-shaped end 30 and object 12 can be moved.

When it is desired to place object 12 in a position to be held by apparatus 10, object 12 is moved so that element 40 is positioned to be grasped by claw-shaped end 30. The user then places his or her foot onto second end 32 of element 24 and pushes in a downward direction 38. This causes rotation of element 24 in direction 38 about pivot pin or pins 26 to permit element 40 to be moved into position for engagement or cooperation with claw-shaped end 30. When the user's foot is released from second end 32, the action of spring 44 in cooperation with element 46 pushes upwardly against element 24 and causes rotation of element 24 in direction 36 until claw-shaped end 30 engages the ground within open area 64. Element 40 is then held in position between the ground and element 24.

When apparatus 10 is used on concrete or a paved surface, a conventional concrete anchor 18' is anchored into the pavement in a conventional manner. Upper threaded end 22' of anchor 18' is then threaded into cavity 20 so that housing 16 is firmly connected to anchor element 18'. Housing 16 and element 24 will be positioned above the surface of the pavement. The configuration of element 24 and the distance of its working stroke or movement, however, will be such that claw-shaped end 30 will cooperate with element 40, attached to object 12, in the manner previously described so that object 12 will be held in a substantially stationary position. The operation of apparatus 10 when using anchor 18' is otherwise identical to the operation previously described for apparatus 10 when using anchor element 18.

Concrete anchor 18' is preferably comprised of steel or other suitable metal, as is well known. Screw element 18 is preferably comprised of steel, other metal or conventional plastic material, and the remaining components of apparatus 10 are also preferably comprised of conventional metal or plastic materials.

Housing 16 is preferably provided with a sloped surface 16' to permit movement of element 24 about pin or pins 26 so that claw-shaped end 30 will engage element 40 in the manner described when apparatus 10 is positioned in the ground or on a paved surface.

Although the dimensions of apparatus 10 may vary, one set of preferred dimensions provides that the height of housing 16 at rear wall 16" be one and one quarter inches, the length of housing 16 be two and one-half inches, and the stroke or distance of vertical movement of post 58 during operation be three-quarters of one inch. The length of claw-shaped end 30 is preferably about three-quarters of one inch, the depth and diameter of cavity 20 are each about three-quarters of one inch, and the diameter of cavity 42 is also about three-quarters of one inch. End 32 of element 24 is preferably covered by a rubber pad or covering 32' which acts as a non-slip surface or pedal, and cover 32' is preferably about two inches by three inches long.

The invention in its broader aspects is not limited to the specific details shown and described, and departures may be made from such details without departing from the principles of the invention and without sacrificing its chief advantages.

What is claimed is:

1. Apparatus for holding an object substantially stationary on a supporting surface, said apparatus comprising:
   a first supporting element;
   a second element for attachment to said first element for anchoring to said supporting surface;

a third element pivotally connected to said first element, said third element defining a first substantially claw-shaped end and an opposed second end;

first means in operative relationship with said first and third elements for normally pivotally urging said third element in a first direction and for enabling pivotal movement of said third element in a second direction in response to an external force applied to said second end; and a fourth element connected to said object for selective cooperation with said claw-shaped end to be held by and between said third element and said supporting surface when said third element is moved in said first direction, whereby said object is prevented from being blown over, toppled or carried away by the action of animals or the wind.

2. Apparatus as in claim 1 wherein said first supporting element defines a first cavity therein and wherein said first means includes a spring positioned within said first cavity.

3. Apparatus as in claim 2 wherein said first means further includes an additional element positioned between said spring and said third element.

4. Apparatus as in claim 1 wherein said first supporting element includes an internally threaded cavity for removable attachment to said second element.

5. Apparatus as in claim 2 wherein said first supporting element further defines a drainage opening in fluid communication between said first cavity and an exterior surface of said first supporting element.

6. Apparatus as in claim 1 wherein said second element includes a screw element for screwing into the ground.

7. Apparatus as in claim 1 wherein said second element includes an anchor element for anchoring to concrete, asphalt or pavement.

8. Apparatus as in claim 3 wherein said additional element is positioned at least partially within said first cavity and wherein said additional element extends outwardly from said first cavity.

9. Apparatus as in claim 8 wherein said first supporting element defines an upper surface and wherein said upper surface defines an upper opening therein in communication with said first cavity and wherein a portion of said additional element extends through said upper opening.

10. Apparatus as in claim 9 wherein said portion of said additional element normally engages said third element.

11. Apparatus as in claim 9 further including a liquid-sealing element positioned at said upper opening for normally liquid-sealingly and slidingly contacting said portion of said additional element to prevent entry of liquid, such as water, into said first cavity.

12. Apparatus as in claim 1 wherein said fourth element is connected to said object in a position to normally contact said supporting surface.

13. Apparatus as in claim 12 wherein said fourth element is configured to define an open area between said fourth element and said object for receiving said claw-shaped end, whereby a portion of said fourth element can be positioned and held between said third element and said supporting surface.

14. Apparatus for holding an object substantially stationary on a supporting surface, said apparatus comprising:

a first supporting element;

a second element for attachment to said first element for anchoring to said supporting surface;

a third element pivotally connected to said first element, said third element defining a first substantially claw-shaped end and an opposed second end;

first means in operative relationship with said first and third elements for normally pivotally urging said third element in a first direction and for enabling pivotal movement of said third element in a second direction in response to an external force applied to said second end;

a fourth element connected to said object for selective cooperation with said claw-shaped end when said third element is moved in said first direction, whereby said object is prevented from being blown over, toppled or carried away by the action of animals or the wind;

wherein said first supporting element defines a first cavity therein and wherein said first means includes a spring positioned within said first cavity;

wherein said first means further includes an additional element positioned between said spring and said third element;

wherein said additional element is positioned at least partially within said first cavity and wherein said additional element extends outwardly from said first cavity;

wherein said first supporting element defines an upper surface and wherein said upper surface defines an upper opening therein in communication with said first cavity and wherein a portion of said additional element extends through said upper opening;

further including a liquid-sealing element positioned at said upper opening for normally liquid-sealingly and slidingly contacting said portion of said additional element to prevent entry of liquid, such as water, into said first cavity; and wherein said additional element includes a substantially disk-shaped element defining a diameter greater than the size of said upper opening, whereby said disk-shaped element cannot pass through said upper opening.

15. Apparatus as in claim 14 wherein said portion of said additional element includes a post connected to said disk-shaped element and extending upwardly through said upper opening in. -sliding and substantially liquid-sealing contact with said liquid-sealing element.

* * * * *